United States Patent
Mestery et al.

(10) Patent No.: US 11,765,146 B2
(45) Date of Patent: Sep. 19, 2023

(54) PARTIAL PACKET ENCRYPTION FOR ENCRYPTED TUNNELS

(71) Applicant: Cisco Technology, Inc., San Jose, CA (US)

(72) Inventors: Kyle Andrew Donald Mestery, Woodbury, MN (US); Ian James Wells, San Jose, CA (US); Grzegorz Boguslaw Duraj, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 350 days.

(21) Appl. No.: 17/002,170

(22) Filed: Aug. 25, 2020

(65) Prior Publication Data
US 2022/0070154 A1 Mar. 3, 2022

(51) Int. Cl.
*H04L 9/40* (2022.01)
*H04L 12/46* (2006.01)
*H04L 9/32* (2006.01)

(52) U.S. Cl.
CPC .......... *H04L 63/0478* (2013.01); *H04L 9/321* (2013.01); *H04L 12/4633* (2013.01); *H04L 63/08* (2013.01)

(58) Field of Classification Search
CPC . H04L 63/0478; H04L 9/321; H04L 12/4633; H04L 63/08; H04L 63/0471;
(Continued)

(56) References Cited

U.S. PATENT DOCUMENTS 8,745,373 B2 6/2014 Molsberry et al.
9,306,913 B1 4/2016 Volkov
(Continued)

FOREIGN PATENT DOCUMENTS

EP 3664407 6/2020
WO WO2021016015 A1 1/2021

OTHER PUBLICATIONS

Stephen J Friedl, "An Illustrated Guide to IPsec", Aug. 24, 2005 (Year: 2005).*
(Continued)

*Primary Examiner* — Joseph P Hirl
*Assistant Examiner* — Aayush Aryal
(74) *Attorney, Agent, or Firm* — Lee & Hayes, P.C.

(57) ABSTRACT

Techniques and mechanisms to reduce double encryption of packets that are transmitted using encrypted tunnels. The techniques described herein include determining that portions of the packets are already encrypted, identifying portions of the packets that are unencrypted, and selectively encrypting the portions of the packets that are unencrypted prior to transmission through the encrypted tunnel. In this way, potentially private or sensitive data in the packets that is unencrypted, such as information in the packet headers, will be encrypted using the encryption protocol of the encrypted tunnel, but the data of the packets that is already encrypted, such as the payload, may avoid unnecessary double encryption. By reducing (or eliminating) the amount of data in data packets that is double encrypted, the amount of time taken by computing devices, and computing resources consumed, to encrypted traffic for encrypted tunnels may be reduced.

16 Claims, 6 Drawing Sheets

(58) Field of Classification Search
CPC .. H04L 63/105; H04L 63/166; H04L 63/0272
See application file for complete search history.

(56) References Cited

U.S. PATENT DOCUMENTS

| | | | |
|---|---|---|---|
| 9,712,504 B2 | 7/2017 | Kurmala et al. | |
| 10,601,781 B2 | 3/2020 | Merritt | |
| 2010/0124332 A1* | 5/2010 | Arena | H04L 9/3226 |
| | | | 380/270 |
| 2010/0161960 A1* | 6/2010 | Sadasivan | H04L 63/1408 |
| | | | 713/152 |
| 2016/0315920 A1* | 10/2016 | Kurmala | H04L 63/0471 |
| 2017/0214774 A1* | 7/2017 | Chen | G06F 13/385 |
| 2020/0186507 A1* | 6/2020 | Dhanabalan | H04L 63/029 |

OTHER PUBLICATIONS

Steve Friedl: "An Illustrated Guide to IPsec", Aug. 24, 2005 (Aug. 24, 2005), XP055014334, Retrieved from the Internet: URL: http://www.unixwiz.net/techtips/iguide-ipsec.html [retrieved on Dec. 8, 2011] pp. 1-4.
International Search Report and Written Opinion for PCT Application No. PCT/US21/43519, dated Oct. 29, 2021, 121 pages.

* cited by examiner

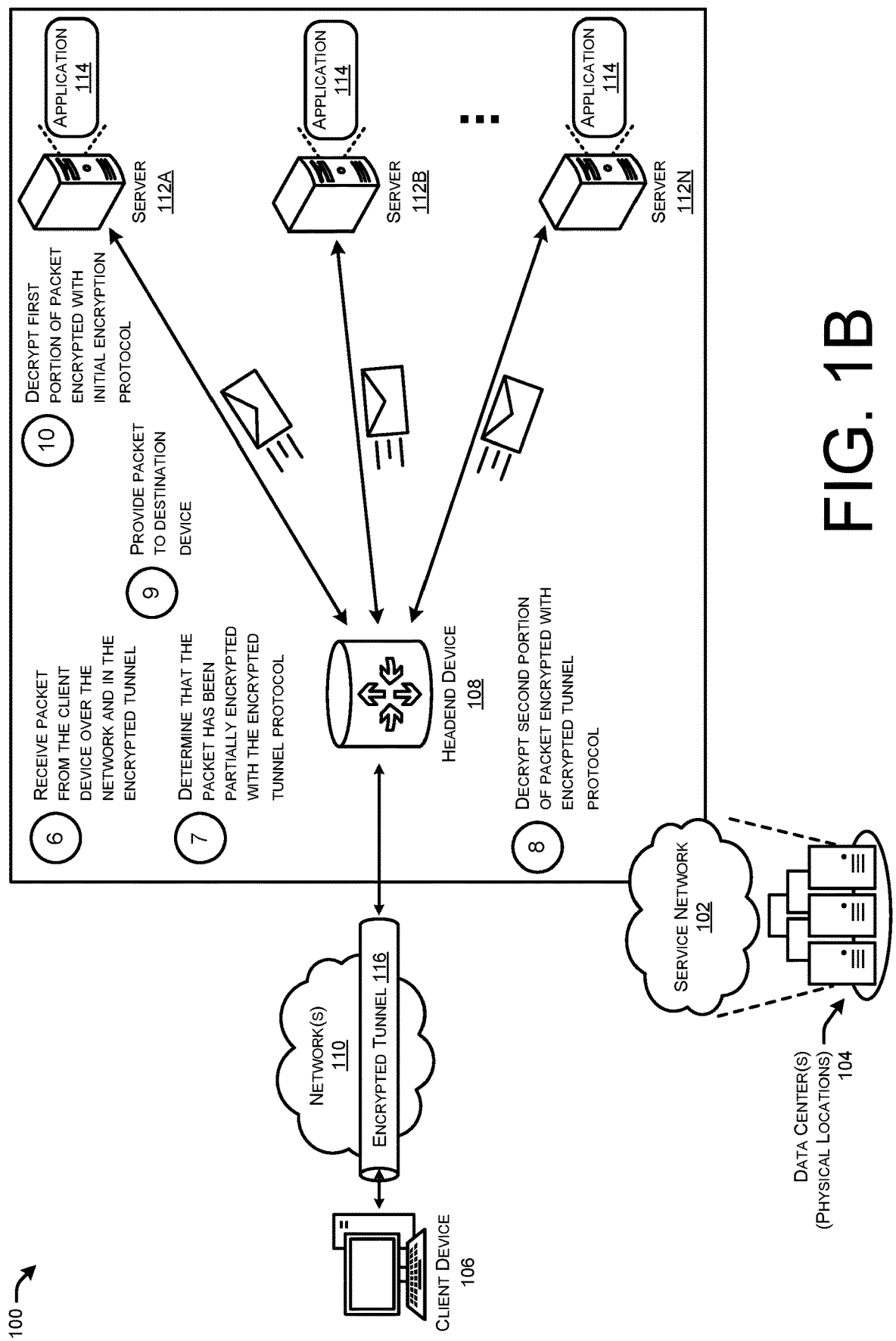

PARTIAL PACKET ENCRYPTION FOR ENCRYPTED TUNNELS

TECHNICAL FIELD

The present disclosure relates generally to encrypting packets for transmission through an encrypted tunnel, such as a virtual private network (VPN) network. More specifically, the techniques relate to optionally encrypting packets that are transmitted through the encrypted tunnel.

BACKGROUND

Users of computing devices often desire to transport various types of information across networks for a variety of reasons. For instance, users of computing devices use networks to browse websites, access online services or applications, remotely access VPNs, and so forth. While performing these types of activities are certainly desirable, many of the networks used to transport the information are public networks, such as the Internet. These public networks are often unsecured environments where the privacy of the data communications of users may be compromised.

In order to protect the confidentiality and privacy of data transmitted across networks by users of computing devices, it is common to encrypt the data being transmitted in order to obfuscate the data to prevent potentially malicious entities from obtaining the data. For instance, VPNs use a process called "tunneling" to extend a private network across a public network, such as the Internet. The process of tunneling involves encrypting the data prior to transmission at the sending device to obfuscate the encrypted data as it is transmitted across the networks, and then decrypting the data at the receiving device at the VPN to act on the data.

Encrypted tunnels, such as VPN tunnels, have become commonplace and have many uses and advantages. However, the process of encrypting data for transmission through the tunnels is time consuming and computationally intensive. Additionally, some types of data packets communicated through an encrypted tunnel may already be encrypted according to the protocol that was used to create the data packets that are to be transmitted. Accordingly, it may be redundant to encrypt a data packet for transmission through an encrypted tunnel when that data packet is already encrypted.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1B illustrates a system-architecture diagram of an environment in which a client device sends an encrypted packet to a headend device, and the headend device determines that a first portion is encrypted with an initial encryption protocol and that a second portion is encrypted with an encryption protocol of the encrypted tunnel. The headend device then decrypts the second portion using the encryption protocol, and decrypts the first portion using the initial encryption protocol.

DESCRIPTION OF EXAMPLE EMBODIMENTS

Overview

Figure 1A:
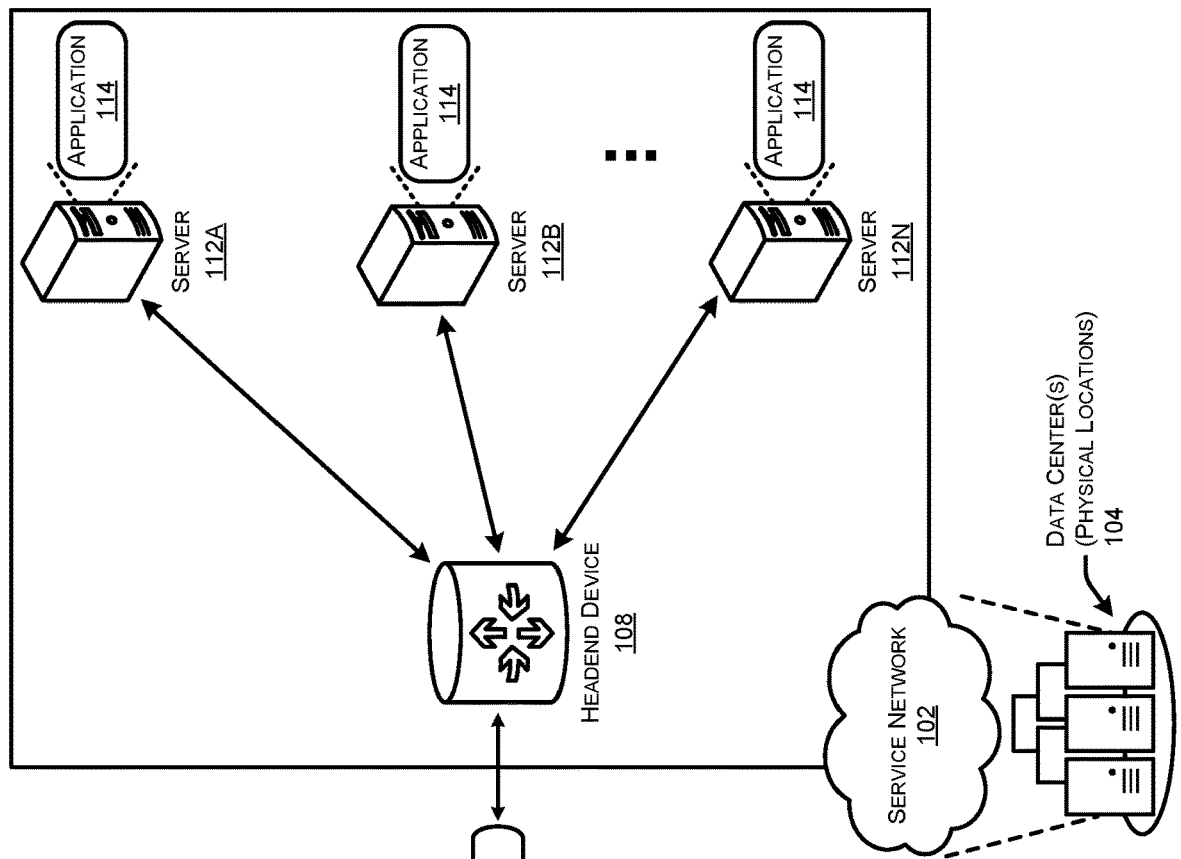
FIG. 1A illustrates a system-architecture diagram of an environment in which a client device establishes an encrypted connection with a headend device. The client device determines that a packet is to be transmitted to the headend device via the encrypted tunnel, determines that a first portion of the packet is encrypted, and encrypts a second portion of the packet according to an encryption protocol of the encrypted tunnel.
Figure 1A:
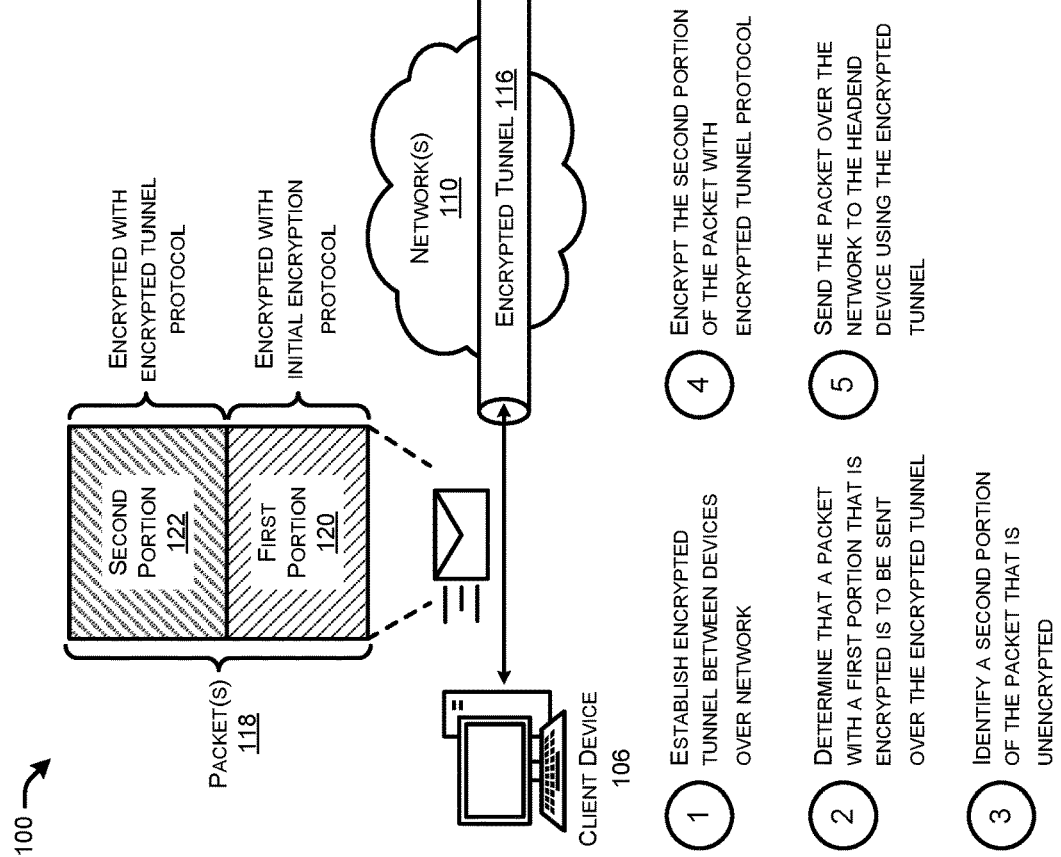

The present disclosure relates generally to encrypting packets for transmission through an encrypted tunnel, such as a virtual private network (VPN) network. More specifically, the techniques relate to selectively encrypting portions of packets to be sent through the encrypted tunnel such that double encryption of the packet is at least partially avoided.

A method to perform techniques described herein may include creating an encrypted tunnel over a network and between a first device and a second device to communicate encrypted data over the network, and determining that a packet is to be sent to the second device over the network in the encrypted tunnel. Further, the techniques include determining that a first portion of the packet is encrypted, and determining that a second portion of the packet is unencrypted. Additionally, the techniques include encrypting the second portion of the packet using an encryption protocol associated with the encrypted tunnel, and sending the packet over the network to the second device using the encrypted tunnel.

A further method to perform techniques described herein may include creating an encrypted tunnel over a network and with a source device to communicate encrypted data over the network, and receiving a packet that is sent from the source device over the network and in the encrypted tunnel. Further, the method may additionally include determining that a first portion of the packet is encrypted using a first encryption protocol associated with the encrypted tunnel, and decrypting the first portion of the packet according to the first encryption protocol. Additionally, the method may include determining that a second portion of the packet is encrypted using a second encryption protocol, and decrypting the second portion of the packet according to the second encryption protocol.

Additionally, the techniques described herein may be performed by a system and/or device having non-transitory computer-readable media storing computer-executable instructions that, when executed by one or more processors, performs the method described above.

Example Embodiments

Encrypted tunnels have become commonplace in society, and users of devices often use encrypted tunnels to transport data securely across various types of non-secure networks, such as the Internet, for a variety of reasons. A popular use of encrypted tunnels is in VPNs where traffic is encrypted in a private network by a device and transmitted across the Internet to various destinations such that the encrypted data is secure despite being transmitted on a non-secure network. Encrypted tunnels allow users to perform many activities, such as privately browsing the Internet, accessing private or sensitive data stored at another location (e.g., bank account information, health information, etc.), and accessing confidential business information stored in a private network of an employer to allow users to work remote from their offices.

As noted above, encrypted tunnels have become essential to our everyday life, and the use of encrypted tunnels continues to grow and diversify. However, the encryption protocols used to encrypt data for these encrypted tunnels are time consuming, and also require consumption of high amounts of compute resources of devices and any offload hardware chips. Thus, it may be advantageous to avoid encrypting data where possible, but still encrypting data when necessary to protect private data.

In some instances, data that is to be transmitted through an encrypted tunnel may already be encrypted using another encryption protocol, such as data packets encrypted according to Hypertext Transfer Protocol Secure (HTTPS), Secure Shell (SSH) protocol, and so forth. However, encryption protocols for encrypted tunnels may re-encrypt all the packets despite the packets already being encrypted using another protocol, and thus already are obfuscated for nonauthorized parties. This double encryption of packets is disadvantageous due to unnecessary time delay as well as compute resource consumption to unnecessarily re-encrypt data that is already encrypted. Accordingly, it would be advantageous to avoid re-encrypting data packets to be sent through an encrypted tunnel when those data packets are already encrypted.

In order to address this, computing devices may attempt to perform split tunneling where users of VPNs can route traffic from specific applications or devices through an encrypted, VPN tunnel while traffic from other applications or devices may travel through a non-encrypted tunnel or even over a default shortest path first (SPF) routing protocol. However, encrypted traffic (e.g., HTTPS, SSH, etc.) still exposes some information about data packets in a flow that an encrypted tunnel hides, such as the destination address of the traffic being visible in a body-encrypted packet (such as part of a Transmission Control Protocol (TCP) data flow or a Quick UDP Internet Connections (QUIC) data flow). Thus, simply routing encrypted traffic (e.g., HTTPS, SSH, etc.) through a non-encrypted tunnel may expose private or sensitive information about the data flow, but routing the encrypted traffic through an encrypted tunnel may result in double encryption for the packet that is time consuming and has high CPU consumption.

This disclosure describes techniques and mechanisms to reduce double encryption of packets that are transmitted using encrypted tunnels. The techniques include determining that portions of the packets are already encrypted, identifying portions of the packets that are unencrypted, and selectively encrypting the portions of the packets that are unencrypted to be transmitted through the encrypted tunnel. In this way, potentially private or sensitive data in the packets that is unencrypted (e.g., information in the packet headers) will be encrypted using the encryption protocol of the encrypted tunnel, but the data of the packets that is already encrypted (e.g., the payload) may not be double encrypted. By reducing or eliminating the amount of data in data packets that is double encrypted, the amount of time taken, and computing resources consumed, to encrypted traffic for encrypted tunnels may be reduced.

According to the techniques described herein, a computing device may establish an encrypted connection with another computing device for purposes of communicating encrypted traffic back and forth over one or more networks, which may be public or non-secured networks such as the internet. In some instances, the devices may be a client device establishing an encrypted tunnel, such as a VPN, with a headend device using an encryption protocol. The client device may be running one or more applications that are attempting to communicate with the headend using various types of traffic. In some examples, the application (or other programs) may simply desire to communicate unencrypted traffic using the encrypted tunnel, such as HTTP traffic, that is unencrypted such that all of the data is encrypted using the encryption protocol of the encrypted tunnel.

However, in some instances the applications or programs running on the client device may desire to communicate data flows using communication protocols that encrypt the data, such as HTTPS, SSH, and the like. When a VPN client (or a detection program that manages the encryption tunnel) receives the data packets that are encrypted, but are to be transmitted through the VPN tunnel, the VPN client may determine that at least a portion of the data packets in the flow are encrypted. For instance, the detection program may determine, based on a header of the packet, that the packet is of a particular type associated with HTTPS, SSH, or another protocol that encrypts data of the packets. In some instances, the detection program may analyze the packet and identify the portion of the packet that is encrypted, and the portion that is unencrypted.

The detection program may determine a size of the unencrypted portion of the packet, such as a number of bytes. For instance, if the payload of the packet is encrypted, and the header of the packet is unencrypted, the detection program may determine how many bytes are in the header that are unencrypted. The detection program may simply determine the size of the unencrypted portion based on a predefined format of the packet type (e.g., HTTPS headers have a predefined size). The detection program may determine the portion of the packet that is unencrypted, and the client device (e.g., VPN agent or other program) may selectively encrypt the unencrypted portion of the packet using the encryption protocol of the encrypted tunnel, while refraining from encrypting the already-encrypted portion of the packet. The packet may then be transmitted through the encrypted tunnel such that the private data is obfuscated from unauthorized parties, but double encryption of the data of the packet is reduced.

In some instances, only the unencrypted portions of the packet may be encrypted using the encryption protocol of the encrypted tunnel. However, in some instances the encryption protocol may encrypt blocks of data according to a predefined block size. In such instances, rather than padding or adding nonce data into the packet, the VPN client may encrypt enough blocks of data such that the unencrypted data is encrypted, and a relatively small portion of the encrypted data may also be encrypted using the tunneling protocol of the encrypted tunnel due to a multiple of the block size being greater than a total size of the unencrypted data.

Although the techniques described herein are with respect to encrypted tunnels established between client devices and headend devices, the techniques are equally applicable to any type of device or devices that utilized encrypted tunnels in any way. Further, the techniques are generally applicable to any type of tunneling protocol, such as Internet Protocol Security (IPsec), WireGuard, Point-to-Point Tunneling Protocol (PPTP), OpenVPN, SSTP, Internet Key Exchange version 1 (IKEv1), IKEv2, and/or any other encryption tunneling protocol. Further, the techniques are applicable to any type of data that may be at least partially encrypted prior to being transmitted through an encrypted tunnel, such as HTTPS, SSH, and/or any other communication protocol.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment 100 in which a client device 106 establishes an encrypted connection with a headend device 108. The client device 106 determines that a packet is to be transmitted to the headend device 108 via the encrypted tunnel, determines that a first portion of the packet is encrypted, and encrypts a second portion of the packet according to an encryption protocol of the encrypted tunnel.

In some instances, the client device 106 may communicate with the headend device 108 in order to access some backend service or application managed by a service network 102. The service network 102 may generally include, manage, or otherwise be associated with one or more applications or services utilized by a user of the client device 106. The service network 102 may provide any type of application or service for use by users of the client device 106. However, in other instances the headend device 108 may be associated with any type of computing device and be used for any purpose.

In some examples, the environment 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

In some instances, the client device 106 may desire to, or request, access to an application 114 hosted on servers 112A, 112B, to 112N (where "N" is any integer). The application 114 may comprise any type of application 114, such as web-based applications, services managed by cloud service providers, datastores or services of enterprise networks, and/or any other type of application 114.

The client device 106 and headend device 108 may establish a communication connection over one or more networks 110. The network(s) 110 may include any viable communication technology, such as wired and/or wireless modalities and/or technologies. Networks 126 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The client device 106 and headend device 108 may communicate using any type of protocol over the network 110, such as the transmission control protocol/Internet protocol (TCP/IP) that is used to govern connects to and over the Internet.

However, the client device 106 and headend device 108 may, at "1," establish an encrypted tunnel 116 over the networks 110 to send and receive encrypted data over the networks 110. The encrypted tunnel 116 may be established by, for example, VPN clients running on the client device and/or headend device 108. The encrypted tunnel 116 may be established using any type of tunneling protocol, such as (but not limited to) Internet Protocol Security (IPsec), WireGuard, Point-to-Point Tunneling Protocol (PPTP), OpenVPN, SSTP, Internet Key Exchange version 2 (IKEv2), and/or any other encryption tunneling protocol. In this way, data may be encrypted using an encryption protocol of the encrypted tunnel 116 prior to being sent over the networks 110 by the client device 106 and/or headend device 108. The encrypted tunnel 116 may be established between the client device 106 and headend device 108 using any handshake or establishment technique known in the art.

At "2," the client device 106 may determine that a packet 118 with a first portion 120 that is encrypted is to be sent over the encrypted tunnel. For instance, an application or program running on the client device 106 may desire to communicate data over the encrypted tunnel 116, and that application or program may be configured to communicate data using HTTPS, SSH, and/or any other secure/cryptographic communication protocol.

In some examples, determining that the packet 118 has the first portion 120 encrypted with an initial encryption protocol may be performed using one or more detection programs. For instance, a detection program may be a Network Based Application Recognition (NBAR) type program that may include a feature for protocol discovery. Protocol discovery provides a simple way to discover the application protocol packets 118 that are passed through an interface of the client device 106 and headless device 108. The NBAR program may perform protocol discovery for packets 118 and classify the packets 118 as being of a particular protocol. Protocol discovery may be enabled on a tunnel interface, a physical interface on which the tunnel interface is configured, and the packets 118 that are designated to the tunnel interface may be counted on both interfaces. On the physical interface, the packets 118 may be classified and counted based on the encapsulation, and on the tunnel interface, the packets 118 may be classified and counted based on the protocol, such as the Layer 7 protocol.

In some instances, determining that the packet 118 has the first portion 120 encrypted with an initial encryption protocol may be performed by inferring a protocol based on a port of the packets. For instance, the detection program may identify packets 118 with a destination port of 443, which is typically used for HTTPS, and determine that the packets 118 are using an encrypted protocol that secures at least the body of the packets 118 like HTTPS. As another example, the detection program may determine that packets 118 have a destination port of 22, which is typically used for SSH, and determine that the packets 118 are using an encrypted protocol that secures at least the body of the packets 118 like SSH.

Generally, the first portion 120 may be encrypted with any initial encryption protocol, such as Secure Sockets Layer (SSL) protocol, Transport layer Security (TLS) protocol, Datagram Transport Layer Security (DTLS) protocol, and/or any other encryption protocol. Thus, the first portion 120 may be encrypted according to any encryption protocol that is used for the particular communication protocol (e.g., HTTP over TLS, HTTP over SSL, etc.).

Thus, at "2," the detection program running on the client device 106 may determine, based on the protocol type and/or through shallow packet processing (e.g., NBAR), that the packet 118 has a first portion 120 that has been encrypted with an initial encryption protocol. For instance, the detection program may determine, based on processing the packet 118, that the first portion 120 has been encrypted. In another example, the detection program may simply determine that the protocol type of the packet 118 is such that the first portion 120 of the packet 118 is encrypted (e.g., HTTPS, SSH, etc.). In some instances, the first portion 120 of the packet 118 may include at least the body and/or payload of the packet 118. Thus, the detection program may analyze the packet 118 and detect the first portion 120 of the packet as being encrypted with an initial encryption protocol, and/or may determine a protocol type of the packet 118 and infer or determine that the first portion 120 of the packet 118 is encrypted (e.g., SSH encrypts a predefined size or portion of the packet 118, HTTPS encrypts a predefined size or portion of the packet 118, etc.).

In some instances, to determine a size of the first portion 120 of the packet 118 that has been encrypted, a creator of the packet 118 may positively identify the size of the first portion 120 that has been encrypted using, for instance, an additional IP option header, a differentiated services code point (DSCP) marking or value, and/or another technique such that the client device 106 may identify that marking or value to determine a size of the first portion 120.

At "3," the detection program running on the client device 106 may identify a second portion 122 of the packet that is unencrypted. For instance, the detection program may determine that a second portion 122 of the packet 118, such as a header of the packet 118, is unencrypted. In some instances, protocols such as SSH, HTTPS, and the like, may encrypt a body or payload of the packet 118 (e.g., the first portion 120), but may not encrypt a header that includes a destination address, a source address, and/or other fields. However, a packet 118 (e.g., Internet Protocol (IP) version 4, IPv6, etc.) encrypted using an encryption protocol may not have an encrypted header and/or other portions (e.g., the second portion 122). Thus, the client device 106 may determine that the second portion 122 of the packet 118 is unencrypted based on a protocol type used to encrypt the first portion 120 of the packet 118, based on processing of the packet 118, and/or in any other way.

At "4," the client device 106 may encrypt the second portion 122 of the packet with the encrypted tunnel protocol used to establish the encrypted tunnel 116 (e.g., IPsec, WireGuard, PPTP, OpenVPN, SSTP, IKEv2, etc.). However, the client device 106 (e.g., VPN gateway and/or any other program associated with the encrypted tunnel 116) may refrain from encrypting the first portion 120 that is already encrypted, or at least refrain from encrypting a majority of the first portion 120. In this way, the second portion 122 that was unencrypted may be encrypted using the encrypted tunnel 116 protocol in order to obfuscate information in at least the header of the packet 118 that may be sensitive or private data. However, rather than simply encrypting the entire packet 118 such that the first portion 120 is double-encrypted, the first portion 120 (or the majority of the first portion 120) may be refrained from being double encrypted to lessen the amount of time and compute power required to encrypt the packet 118. In this way, the packet 118 is encrypted, other than potentially an overlay header, such that the information of the packet 118 is hidden when being transmitted over the network 110.

In some instances, the client device 106 may determine a size of the second portion 122 and ensure that the second portion 122 is encrypted using the encrypted tunnel 116 protocol. For instance, the detection program may analyze the packet 118 and determine a size (e.g., number of bytes) of the second portion 122, and/or determine or infer the size of the second portion 122 based on a protocol type and/or standard for the packets (e.g., IP packets have headers of a predefined size, HTTPS/SSH packets have headers of a predefined size, etc.). In some instances, the encryption protocol may encrypt blocks of data of the second portion 122 according to a predefined block size. In such instances, rather than padding or adding nonce data into the packet 118, the VPN client may encrypt enough blocks of data such that the unencrypted data of the second portion 122 is encrypted, and a relatively small portion of the first portion 120 may also be encrypted using the tunneling protocol of the encrypted tunnel 116 due to a multiple of the block size being greater than a total size of the unencrypted data.

In some instances, the overlay technology that is being used to communicate packets 118 may be extended to indicate how much of the packet 118 the overlay technology has chosen to encrypt, such as the size of the second portion 122. For instance, the tunneling protocol used for the encrypted tunnel 116 may have an additional field in the overlay header, and may indicate a number of bytes of the packet 118 (starting at byte 0 of the header), that have been encrypted. In this way, the headend device 108 may determine the number of bytes of the packet 118 that are in the second portion 122 that have been encrypted with the encrypted tunnel protocol based on a value being included in a field of the overlay header. Thus, the client device 106 may insert a value or marking in a field of the overlay header of the packet 118 that indicates to the headend device 108 how many bytes, or a size, of the packet 118 that has been encrypted using the encrypted tunnel 116. At "5," the client device 106 may send the packet 118 over the network 110 to the headend device 108 using the encrypted tunnel 116.

FIG. 1B illustrates a system-architecture diagram of the environment 100 in which the client device 106 sends an encrypted packet 118 to the headend device 108, and the headend device 108 determines that the first portion 120 is encrypted with an initial encryption protocol and that the second portion 122 is encrypted with an encryption protocol of the encrypted tunnel 116. The headend device 106 then decrypts the second portion 122 using the encryption protocol, and decrypts the first portion 120 using the initial encryption protocol.

At "6," the headend device 108 may receive the packet 118 from the client device 106 over the network 110 and in the encrypted tunnel 116. At "7," the headend device 108 may determine that the packet 118 has been partially encrypted with the encrypted tunnel 116 protocol. For instance, the headend device 108 may identify, from an additional field of the overlay header, a value or marking that indicates a number of bytes of the packet 118 (starting at byte 0 of the header), that have been encrypted. In this way, the headend device 108 may determine the number of bytes of the packet 118 that are in the second portion 122 that have been encrypted with the encrypted tunnel protocol based on a value being included in a field of the overlay header.

At "8," the headend device 108 may decrypt the second portion 122 of the packet 118 encrypted with the encrypted tunnel protocol of the encrypted tunnel 116. For instance, the headend device 108 may determine, from a header of the packet 118, a size of the second portion 122 of the packet 118 that is encrypted with the encrypted tunnel protocol, and encrypt that second portion 122 using the encrypted tunnel protocol of the encrypted tunnel 116.

At "9," the headend device 108 may provide 108 the packet 118 to one or more destination devices that are indicated by a destination address in the packet 118 header (and/or forward the packet 118 to a next hop in the path), such as one or more of the servers 112. The packet 118 may be partially decrypted in that the first portion 120 of the packet 118 may still be encrypted using the initial encryption protocol (e.g., TLS, DTLS, SSL, etc.).

At "10," the application 114 may decrypt the first portion 120 of the packet 118 using the initial encryption protocol, such as TLS, DTLS, SSL, and the like. The application 114 may then be able to analyze a payload of the packets 118 and take appropriate actions based on the contents of the packets 118.

Figure 2:
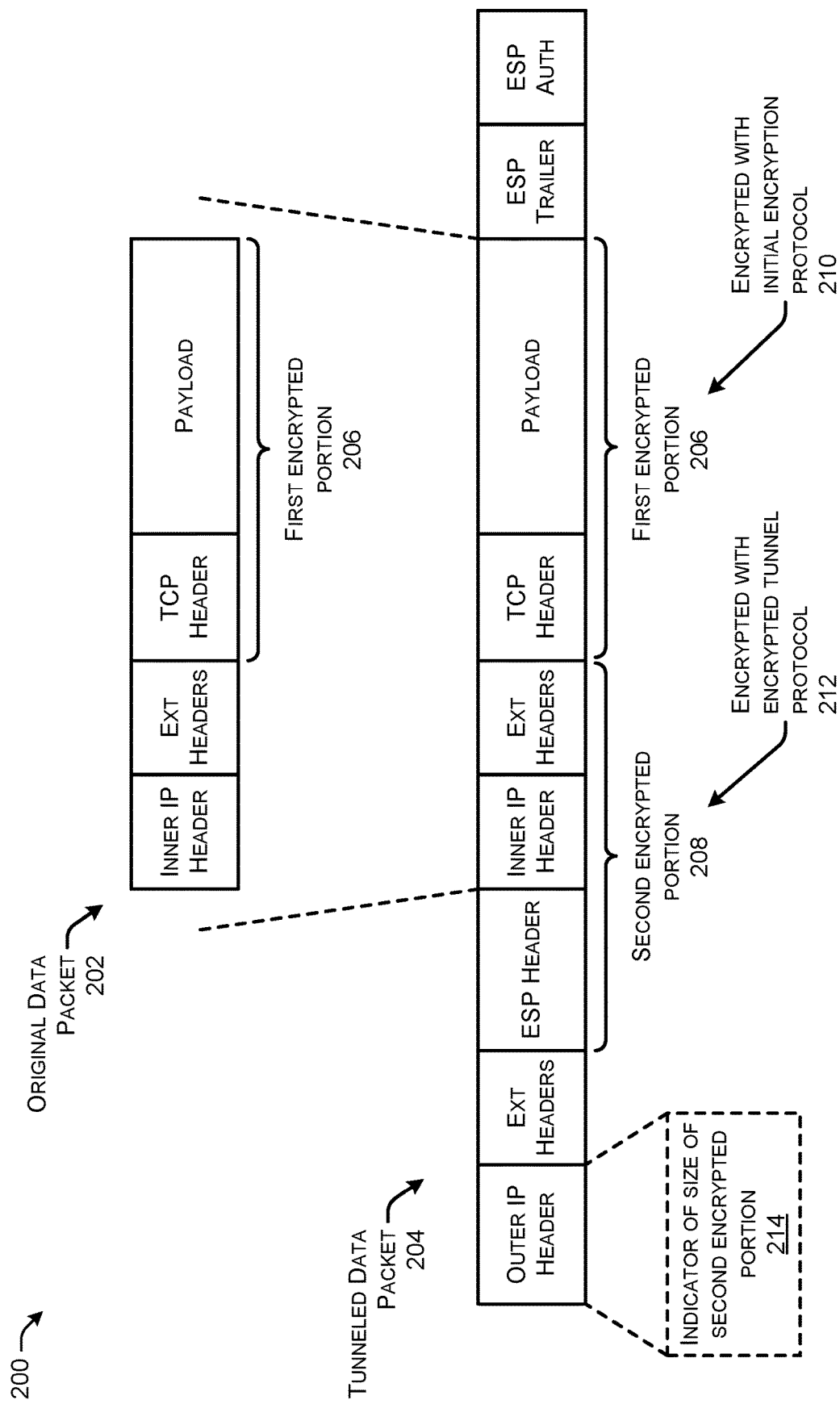
FIG. 2 illustrates an example of a data packet that is encrypted using an initial encryption protocol, and then encrypted using an encryption protocol associated with an encryption tunnel to generate an encrypted tunnel data packet.

FIG. 2 illustrates an example environment 200 including a data packet that is encrypted using an initial encryption protocol, and then encrypted using an encryption protocol associated with an encryption tunnel to generate an encrypted tunnel data packet.

As illustrated, an original data packet 202 may include a payload, a TCP header, one or more extension headers, and an inner IP header. In the illustrative example, the original data packet 202 may have a first encrypted portion 206 encrypted using an initial encryption protocol (e.g., SSL, TSL, DTSL, etc.). The original data packet 202 may then be encapsulated to create a tunneled data packet 204.

The original data packet 202 may be encapsulated to create the tunneled data packet 204, which may be an IPsec packet in some instances, as illustrated, the tunneled data packet 204 may include an Encapsulating Security Payload (ESP) trailer and ESP authorizer, and may further include an ESP header, extension headers, and an outer IP header. As illustrated, the tunneled data packet 204 may have a second encrypted portion 208 that includes the ESP header, the inner IP header and inner extension headers. However, the second encryption portion 208 may not overlap (or may not substantially overlap) with the first encrypted portion 206 to reduce double encryption of the tunneled data packet 204. The second encrypted portion 208 may be encrypted using IPsec, in this example, and the overlay header may be the outer IP header and any extension headers. However, the tunneled data packet 204 is merely illustrative, and any portions of the tunneled data packet 204 may be encrypted and any other protocol may similarly be used other than IPsec.

As shown, the tunneled data packet 204 may include an outer IP header that includes an indicator of a size of the second encrypted portion 214. The indicator may be in the outer IP header of the tunneled data packet 204 (e.g., overlay header for IPsec), and/or in the extension headers of the tunneled data packet 204. The indicator 214 may comprise a value or marker that indicates a size of the second encrypted portion 208 of the tunneled data packet 204 such that a receiving device is able to determine how much of the tunneled data packet 204 needs to be decrypted using the tunneling encryption protocol.

Figure 3:
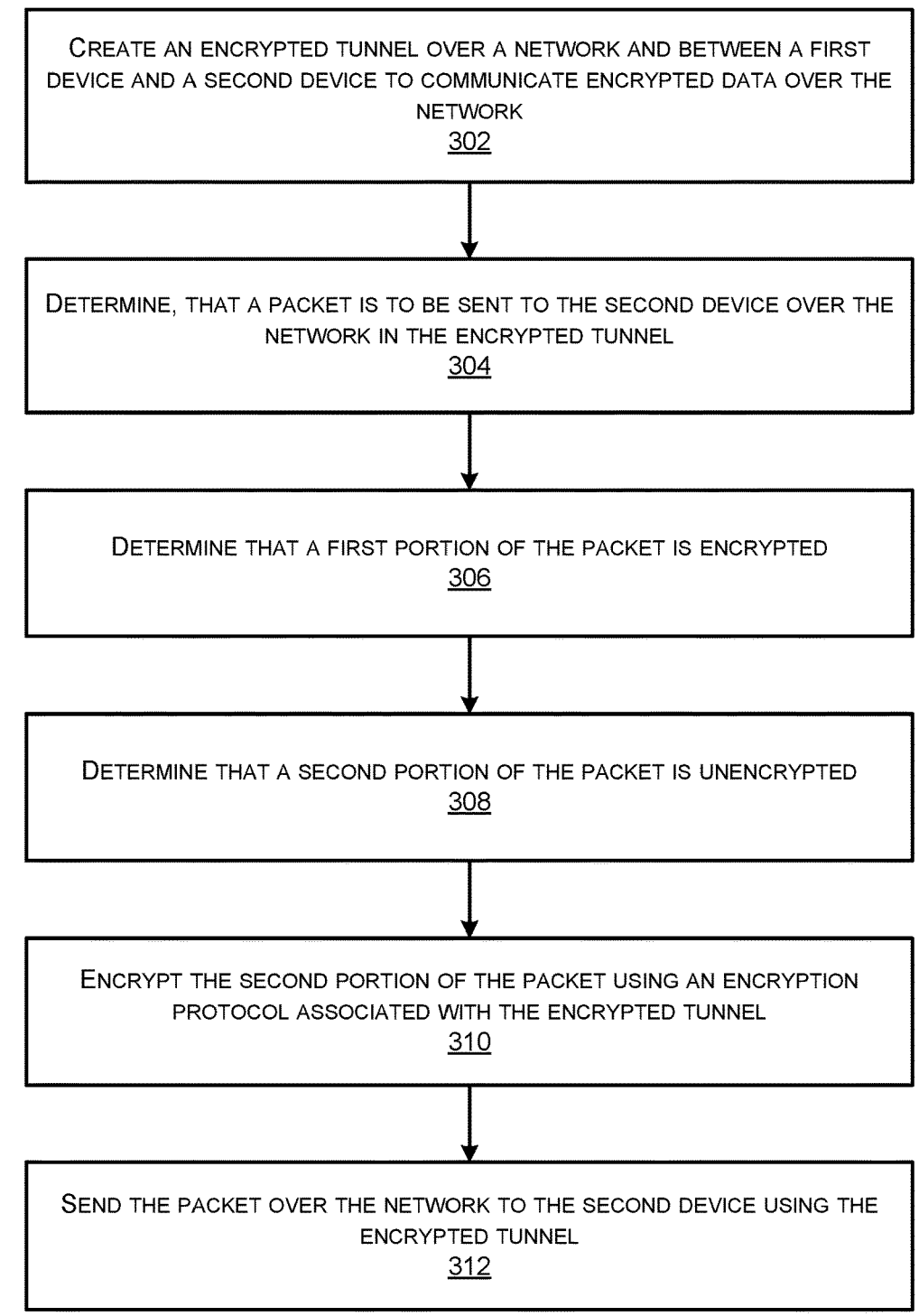
FIG. 3 illustrates a flow diagram of an example method for a first device to determining that a first portion of a packet is encrypted and a second portion of a packet is unencrypted, encrypt the second portion of the packet using an encryption protocol of an encrypted tunnel, and sending the packet to a second device over a network and via the encrypted tunnel.
Figure 4:
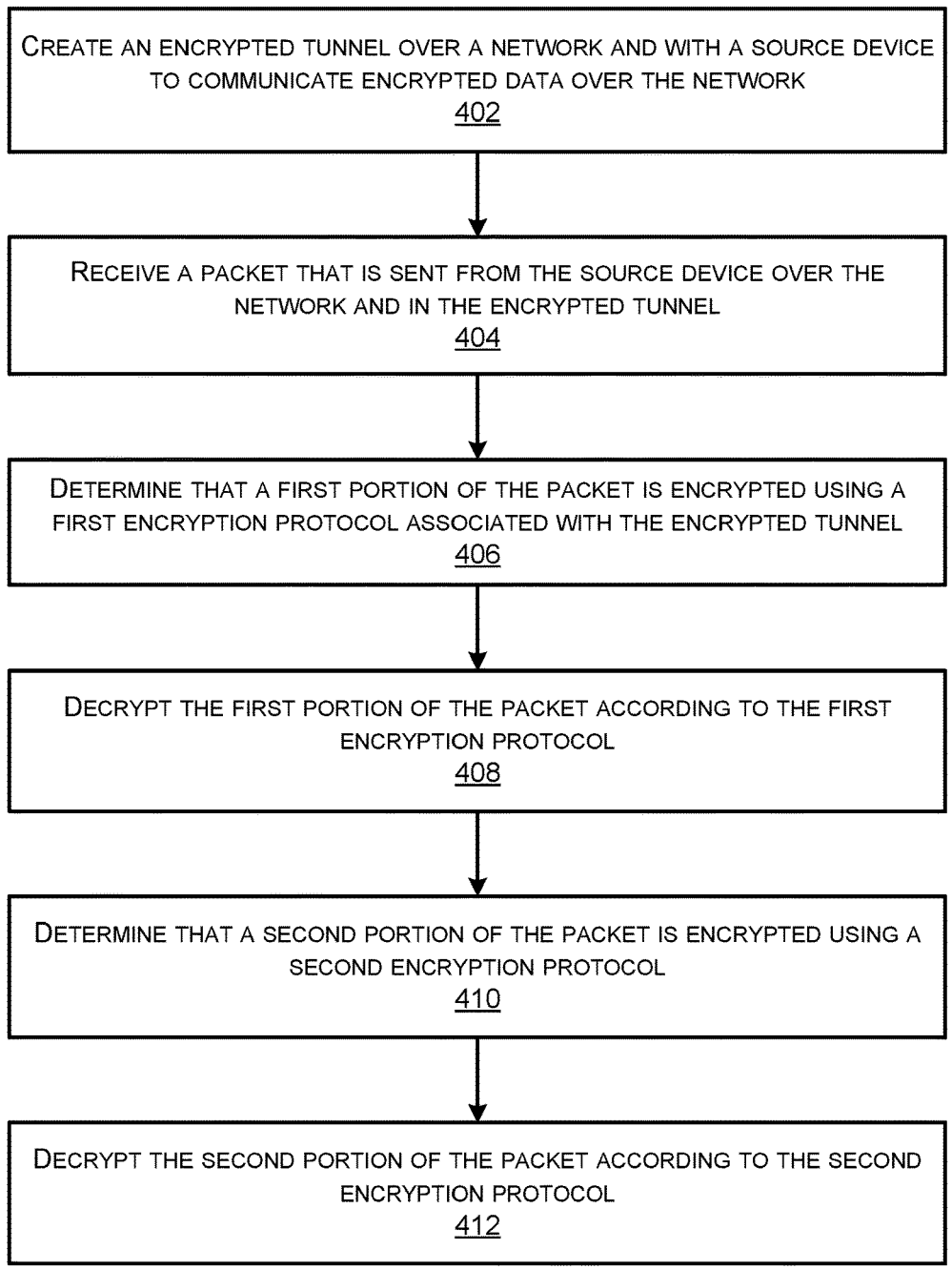
FIG. 4 illustrates a flow diagram of an example method for a first device to receive a packet sent via an encryption tunnel from a second device, determine that a first portion of the packet is encrypted using a first encryption protocol and that a second portion of the packet is encrypted using a second encryption protocol of the encrypted tunnel, and decrypting the packet according to the two encryption protocols.

FIGS. 3 and 4 illustrate flow diagrams of example methods 300 and 400 that illustrate aspects of the functions performed at least partly by the devices described in FIGS. 1A, 1B, and 2, such as the client device 106, the headend device 108, and so forth. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a first device to determining that a first portion of a packet is encrypted and a second portion of a packet is unencrypted, encrypt the second portion of the packet using an encryption protocol of an encrypted tunnel, and sending the packet to a second device over a network and via the encrypted tunnel. In some instances, the steps of method 300 may be performed by a first device (e.g., client device 106) that includes one or more processors and one or more non-transitory computer-readable media storing computer-executable instructions that, when executed by the one or more processors, cause the one or more processors to perform operations of method 300.

At 302, the first device may create an encrypted tunnel over a network with a second device to communicate encrypted data over the network. For instance, the client device 106 may establish an encrypted tunnel 116 over a network 110 with the headend device 108 to communicate encrypted packets or data over the network 110. For instance, the client device 106 and headend device 108 may perform a handshake according to a cryptographic tunneling protocol.

At 304, the first device may determine that a packet is to be sent to the second device over the network in the encrypted tunnel. For instance, the client device 106 may generate a packet 118, or receive a packet, that is to be sent to the headend device 108 over the network 110 and in the encrypted tunnel 116.

At 306, the first device may determine that a first portion of the packet is encrypted. For instance, the client device 106 may determine that a payload of the packet 118 is encrypted. In some instances, the client device 106 may determine that the first portion 120 of the packet 118 is encrypted by identifying, from a header of the packet 118, an indicator that indicates a size of the first portion 120 of the packet 118 that is encrypted. In some instances, the client device 106 may determine a protocol type of the packet 118 (e.g., SSH, HTTPS, etc.) and determine a first portion 120 of the packet 118 that is encrypted according to a predefined size of packets that are encrypted based on that particular protocol type.

At 308, the first device may determine that a second portion of the packet is unencrypted. For instance, the client device 106 may determine that the second portion 122 of the packet 118 is unencrypted (e.g., shallow processing, NBAR, etc.). In some instances, the second portion 122 may include a header of the packet 118 that is unencrypted.

At 310, the first device may encrypt the second portion of the packet using an encryption protocol associated with the encrypted tunnel. For instance, the client device 106 may encrypt the second portion 122 of the packet 118 using the encryption protocol of the encrypted tunnel 116 (e.g., IPsec, WireGuard, PPTP, OpenVPN, SSTP, IKEv2, and/or any other encryption tunneling protocol). In some instances, the method 300 may further include determining to refrain from encrypting (using the tunneling protocol) the first portion 120 of the packet 118 that is encrypted, and/or refraining from encrypting the first portion 120 of the packet 118 that is encrypted.

At 312, the first device may send the packet over the network to the second device using the encrypted tunnel. For instance, the client device 106 may send the packet 118 over the network 110 to the headend device 108 using the encrypted tunnel 116.

In some instances, the method 300 may further include encapsulating the packet 118 in an overlay packet according to an overlay protocol, and populating a field of the overlay header of the overlay packet with an indication of a size of the second portion of the packet. In such examples, sending the packet comprises sending the overlay packet to the second device.

Although the techniques are described as being performed by the client device 106 for sending the packet 118 to the headend device 108, the techniques are equally applicable for the headend device 108 to send the packet 118 to the client device 106 (and/or any other device known in the art for communicating packets).

FIG. 4 illustrates a flow diagram of an example method 400 for a first device to receive a packet sent via an encryption tunnel from a second device, determine that a first portion of the packet is encrypted using a first encryption protocol and that a second portion of the packet is encrypted using a second encryption protocol of the encrypted tunnel, and decrypting the packet according to the two encryption protocols. In some instances, the techniques may be performed by a system (e.g., one or more devices), such as the headend device 108, a server, a combination thereof, and/or any other devices (e.g., hardware offload chips and/or any other device). The techniques of method 400 may be performed by a system that includes one processor, or more than on processor.

At 402, the system may create an encrypted tunnel over a network and with a source device to communicate encrypted data over the network. For instance, the headend device 108 may establish an encrypted tunnel 116 over a network 110 with a client device 106 to communicate encrypted packets or data over the network 110. For instance, the client device 106 and headend device 108 may perform a handshake according to a cryptographic tunneling protocol.

At 404, the system may receive a packet that is sent from the source device over the network and in the encrypted tunnel. For instance, the system may receive a packet 118 that is sent from the client device 106 over the network 110 and in the encrypted tunnel 116.

At 406, the system may determine that a first portion of the packet is encrypted using a first encryption protocol associated with the encrypted tunnel. For instance, the headend device 108 may identify, from an overlay header of the packet 118, an indicator that indicates a size of the first portion 122 of the packet 118.

At 408, the system may decrypt the first portion of the packet according to the first encryption protocol. For instance, the headend device 108 may decrypt the second portion 122 using an encryption protocol of the encrypted tunnel 116, such as TLS, DTLS, SSL, etc.

At 410, the system may determine that a second portion of the packet is encrypted using a second encryption protocol, and at 412, the system may decrypt the second portion of the packet according to the second encryption protocol. In some instances, the headend device 108 may decrypt the first portion (e.g., IPsec, Wireguard, etc.), but a different device, such as a server 112 on which the application 114 is running, may decrypt the second portion of the packet 118 (e.g., the first portion 120 encrypted with the initial encryption protocol such as TLS, DTLS, SSL, etc.).

As explained above, the two or more portions of the packet 118 that are encrypted may not be decrypted by or at the same device, but may be decrypted various devices in a system of devices. That is, the steps of method 400 may, and may not, be performed by one device, but may, or may not, be performed by different devices in a system. In some instances, the headend 108 may perform all of the steps of method 400, and in other examples, at least part of the steps may be performed by an application 114 running on a server 112 (e.g., steps 410 and/or 412 may be performed by the server 112 and/or another device).

Figure 5:
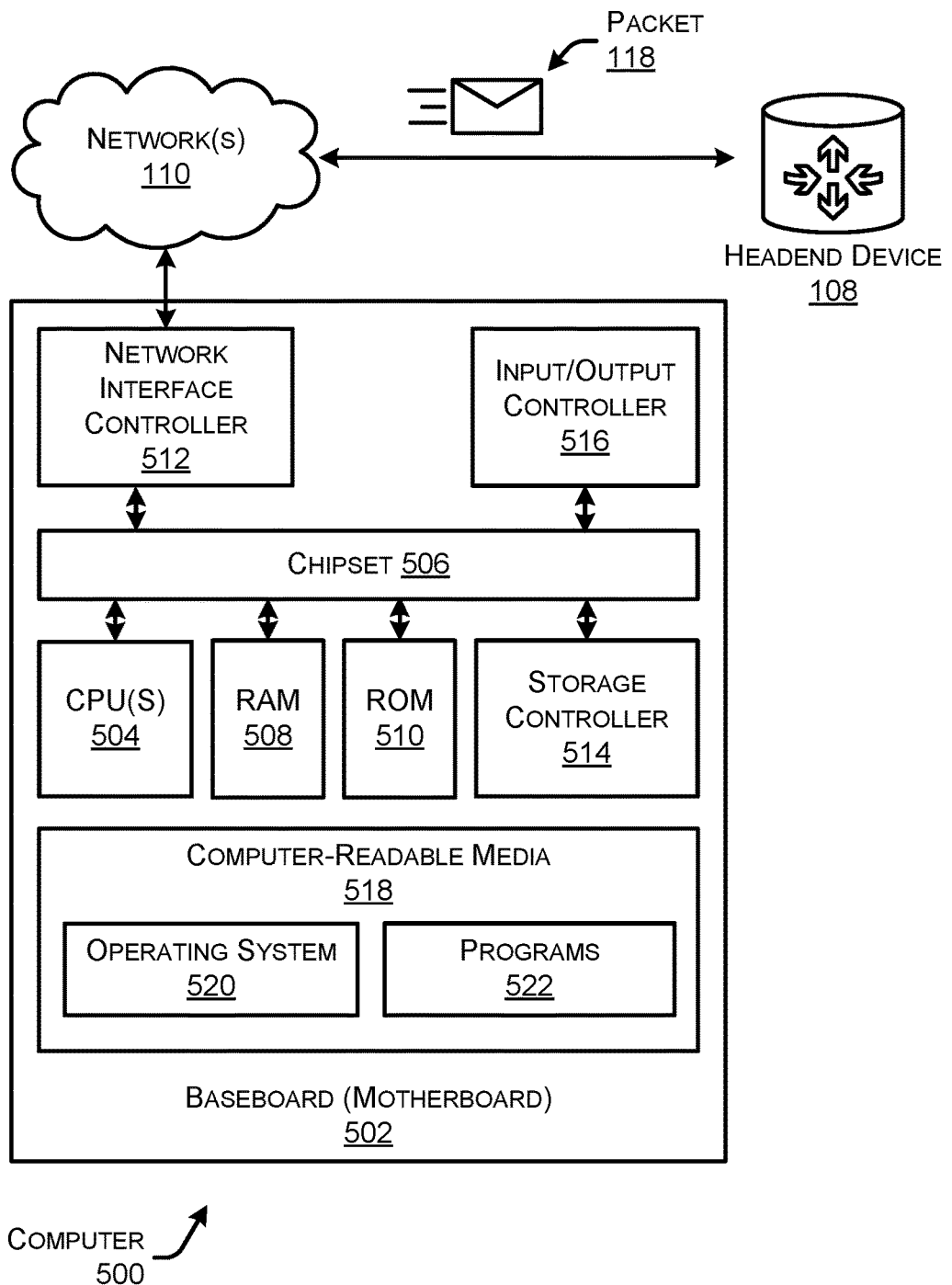
FIG. 5 is a computer architecture diagram showing an illustrative computer hardware architecture for implementing a server device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a client device 106, a headend device 108, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 110. The chipset 506 can include functionality for providing network connectivity through a NIC 512, such as a gigabit Ethernet adapter. The NIC 512 is capable of connecting the computer 500 to other computing devices over the network 110. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the client device 106 and/or headend device 108, and or any components included therein, may be supported by one or more devices similar to computer 500. Stated otherwise, some or all of the operations performed by client device 106 and/or headend device 108, and or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants.

It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 8, can include other components that are not explicitly shown in FIG. 5, or might utilize an architecture completely different than that shown in FIG. 5.

As described herein, the computer 500 may comprise one or more of a client device 106, a headend device 108, and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the client device 106 or headend device 108. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for selectively encrypting the unencrypted portions of packets for transmission through an encrypted tunnel where the packets are at least partially encrypted. For instance, the programs 522 may cause the computer 500 to perform techniques for communicating determining that portions of the packets are already encrypted, identifying portions of the packets that are unencrypted, and selectively encrypting the portions of the packets that are unencrypted prior to transmission through the encrypted tunnel. In this way, potentially private or sensitive data in the packets that is unencrypted, such as information in the packet headers, will be encrypted using the encryption protocol of the encrypted tunnel, but the data of the packets that is already encrypted, such as the payload, may avoid unnecessary double encryption. By reducing (or eliminating) the amount of data in data packets that is double encrypted, the amount of time taken by computing devices, and computing resources consumed, to encrypted traffic for encrypted tunnels may be reduced. Additionally, the programs 522 may comprise instructions that cause the computer 500 to perform the specific techniques for receiving packets through the encrypted tunnel and decrypting portions of the packets using different encryption protocols.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
creating an encrypted tunnel over a network and between a client device and a headend device to communicate encrypted data over the network;
determining, at the client device, that a packet is to be sent to the headend device over the network in the encrypted tunnel;
determining that a first portion of the packet is encrypted;
determining that a second portion of the packet is unencrypted;
identifying a first number of bytes in the second portion of the packet;
identifying a second number of bytes of a block size at which an encryption protocol encrypts data; and
determining that a multiple of the block size corresponds to a third number of bytes that is greater than or equal to the first number of bytes;
encrypting the third number of bytes including the second portion of the packet using the encryption protocol associated with the encrypted tunnel; and
sending, from the client device, the packet over the network to the headend device using the encrypted tunnel.

2. The method of claim 1, further comprising at least one of:
determining to refrain from encrypting the first portion of the packet that is encrypted; or
refraining from encrypting the first portion of the packet that is encrypted.

3. The method of claim 1, wherein:
determining that the first portion of the packet is encrypted includes determining that a payload of the packet is encrypted; and
determining that the second portion of the packet is unencrypted includes identifying a header of the packet that is unencrypted.

4. The method of claim 1, further comprising:
determining a protocol type of the packet;
identifying a first predefined portion of packets that are encrypted according to the protocol type; and
identifying a second predefined portion of packets that are unencrypted according to the protocol type, wherein the first portion is determined based at least part on the first predefined portion and the second portion is determined based at least part on the second predefined portion.

5. The method of claim 1, wherein determining that the first portion of the packet is encrypted includes identifying, from a header of the packet, an indicator that indicates a size of the first portion of the packet that is encrypted.

6. The method of claim 1, further comprising:
encapsulating the packet in an overlay packet according to an overlay protocol; and
populating a field of an overlay header of the overlay packet with an indication of a size of the second portion of the packet,
wherein sending the packet comprises sending the overlay packet to the headend device.

7. The method of claim 1, wherein:
the first portion of the packet is encrypted using at least one of:
Secure Sockets Layer (SSL) protocol;
Transport layer Security (TLS) protocol;
Datagram Transport Layer Security (DTLS) protocol;
Hypertext Transfer Protocol Secure (HTTPS); or
Secure shell protocol (SSH); and
the encryption protocol comprises at least one of:
Internet Protocol Security (IPsec) protocol;
WireGuard;
OpenVPN protocol;
Transport Layer Security (TSL) protocol; or
Secure Sockets Layer (SSL) protocol.

8. A first device comprising:
one or more processors; and
one or more non-transitory computer-readable media storing computer-executable instructions that, when executed by the one or more processors, cause the one or more processors to perform operations comprising:
creating an encrypted tunnel over a network with a second device to communicate encrypted data over the network;
determining that a packet is to be sent to the second device over the network in the encrypted tunnel;
determining that a first portion of the packet is encrypted;
determining that a second portion of the packet is unencrypted;
identifying a first number of bytes in the second portion of the packet;
identifying a second number of bytes of a block size at which an encryption protocol encrypts data; and
determining that a multiple of the block size corresponds to a third number of bytes that is greater than or equal to the first number of bytes;
encrypting the third number of bytes including the second portion of the packet using an encryption protocol associated with the encrypted tunnel; and
sending the packet over the network to the second device using the encrypted tunnel.

9. The first device of claim 8, the operations further comprising at least one of:
determining to refrain from encrypting the first portion of the packet that is encrypted; or
refraining from encrypting the first portion of the packet that is encrypted.

10. The first device of claim 8, wherein:
determining that the first portion of the packet is encrypted includes determining that a payload of the packet is encrypted; and determining, at the first device, that the second portion of the packet is unencrypted includes identifying a header of the packet that is unencrypted.

11. The first device of claim 8, the operations further comprising:
determining a protocol type of the packet;
identifying a first predefined portion of packets that are encrypted according to the protocol type; and
identifying a second predefined portion of packets that are unencrypted according to the protocol type,
wherein the first portion is determined based at least part on the first predefined portion and the second portion is determined based at least part on the second predefined portion.

12. The first device of claim 8, wherein determining that the first portion of the packet is encrypted includes identifying, from a header of the packet, an indicator that indicates a size of the first portion of the packet that is encrypted.

13. The first device of claim 8, the operations further comprising:
encapsulating the packet in an overlay packet according to an overlay protocol; and
populating a field of an overlay header of the overlay packet with an indication of a size of the second portion of the packet,
wherein sending the packet comprises sending the overlay packet to the second device.

14. The first device of claim 8, wherein:
the first portion of the packet is encrypted using at least one of:
Secure Sockets Layer (SSL) protocol;
Transport layer Security (TLS) protocol;
Datagram Transport Layer Security (DTLS) protocol;
Hypertext Transfer Protocol Secure (HTTPS); or
Secure shell protocol (SSH); and
the encryption protocol comprises at least one of:
Internet Protocol Security (IPsec) protocol;
WireGuard;
OpenVPN protocol;
Transport Layer Security (TSL) protocol; or
Secure Sockets Layer (SSL) protocol.

15. A system comprising:
one or more processors; and
one or more non-transitory computer-readable media storing computer-executable instructions that, when executed by the one or more processors, cause the one or more processors to perform operations comprising:
creating an encrypted tunnel over a network and with a source device to communicate encrypted data over the network, wherein the network comprises a public network;
receiving, at a headend device, a packet that is sent from the source device over the network and in the encrypted tunnel;
identifying, from a field in an overlay header of the packet, a value indicating a number of bytes in a first portion of the packet that are encrypted;
determining, at the headend device, that the first portion of the packet is encrypted using a first encryption protocol associated with the encrypted tunnel based at least in part on the value;
decrypting, at the headend device, the first portion of the packet according to the first encryption protocol;
sending, from the headend device, the packet to a server with which the source device is communicating;

determining, at the server, that a second portion of the packet is encrypted using a second encryption protocol; and decrypting, at the server, the second portion of the packet according to the second encryption protocol.

16. The system of claim 15, wherein:

determining that the first portion of the packet is encrypted includes determining that a header of the packet is encrypted; and determining that the second portion of the packet is encrypted includes identifying a payload of the packet that is encrypted.

\* \* \* \* \*